United States Patent Office 2,820,736
Patented Jan. 21, 1958

2,820,736

HALOGENATED STEROIDS

Gerald D. Laubach, Jackson Heights, N. Y., assignor to Chas. Pfizer & Co., Inc., New York, N. Y., a corporation of Delaware No Drawing. Application May 16, 1955
Serial No. 508,801

3 Claims. (Cl. 167—52)

This invention is concerned with certain novel steroid compounds. In particular it is concerned with certain novel halogenated steroid compounds which are hormonally inactive and useful as central nervous system depressants.

This application is a continuation-in-part of application Serial No. 480,614, filed on January 7, 1955, by Gerald D. Laubach (issued May 17, 1955 as U. S. Patent 2,708,651). In that application it was disclosed that compounds having the formula

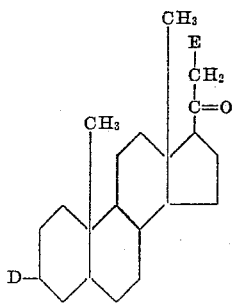

in which D is selected from the group consisting of ionic ester groups having the formula

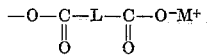

and ionic ester groups having the formula

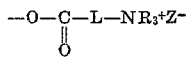

wherein L is chosen from the group consisting of

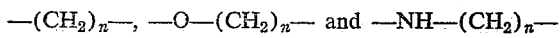

$n$ being a number from 1 to 6, M$^+$ is a cation selected from the class consisting of Na$^+$, K$^+$ and NR$_4^+$, each R represents a member of the group consisting of hydrogen and alkyl, hydroxyalkyl, hydrocarbon carboxyalkyl, aminoalkyl, aryl and aralkyl groups, each containing up to ten carbon atoms, and Z$^-$ is a pharmacologically acceptable anion, hydroxyl and hydrocarbon carboxylic acid esters thereof containing from 1 to 8 carbon atoms in the added moiety, oxime, hydrocarbon carboxylic acid esters thereof containing from 1 to 8 carbon atoms in the added moiety, and ionic esters thereof as defined above, and keto, and in which E is selected from the group consisting of ionic ester groups as defined above, hydroxyl and hydrocarbon carboxylic acid esters thereof containing from 1 to 8 carbon atoms in the added moiety, and hydrogen, with at least one of D and E being an ionic ester group as defined above, are useful as central nervous system depressants. This formula includes both compounds of the pregnane series, that is, those in which the configuration at the 5-position is normal and also compounds of the allopregnane series, that is, those where the configuration at the 5-position is allo. It has now been discovered that certain halogenated derivatives of the compounds having this formula are also useful as central nervous system depressants and as intermediates for the preparation of other compounds useful as central nervous system depressants.

The novel compounds of the present invention are those having the formula given above for the compound of the parent application with either one or two halogen atoms substituted therein. There are several places where the halogen, which may be either chlorine or bromine, may be substituted. When, and only when, the 5-position is allo, either chlorine or bromine may be substituted at the 2-position. When, and only when, the 5-position is normal, either chlorine or bromine may be substituted at the 4-position. Either chlorine or bromine may be substituted at the 17-position regardless of the configuration at the 5-position. Bromine may be substituted at the 21-position regardless of the configuration at the 5-position. This is summarized by saying that the novel compounds of the present invention are those having the above formula and having from 1 to 2 halogen substituents chosen from the class consisting of chlorine and bromine at the 2-position when the 5-position is allo, chlorine and bromine at the 4-position when the 5-position is normal, chlorine and bromine at the 17-position, and bromine at the 21-position.

The novel compounds of this present invention have properties which make them very valuable. Each has the three characteristics of being water soluble, hormonially inactive and active as a central nervous system depressant. They are useful as anesthetic, anti-convulsant, sedative, analgesic and hypnotic agents. They may be employed alone or in combination with other central nervous system depressants. Their water solubility is such that they may be administered intravenously in sterile aqueous solution. Filtration through a Seitz filter is a convenient method of sterilizing a solution to be injected. The compounds may also be employed in aqueous solutions containing other solutes, for example, enough saline or glucose to make them isotonic. They are also suitable for administration by other routes, for example, orally, subcutaneously, and intramuscularly. The compounds may be combined with a variety of pharmacologically acceptable carriers, the choice of which will depend upon the desired method of administration and be determined by standard pharmaceutical practices; for example, the compounds may be administered orally in the form of tablets containing an excipient such as starch, or as elixirs or suspensions in a carrier.

The novel halogenated compounds of the present invention are prepared by the methods to be described below. In general, they are prepared through the introduction of halogen, either into the compounds having the above formula, or, halogen is introduced at an earlier stage of the synthesis, as given in the parent application, of the compounds having the above formula. For example, to prepare the halogenated derivatives of 21-hydroxypregnane-3, 20-dione sodium hemisuccinate, the halogen is introduced into 21-hydroxypregnane-3, 20-dione hemisuccinate, which is then converted to the sodium salt. Alternatively, halogen is introduced into 21-hydroxypregnane-3, 20-dione itself, and then the 21-hydroxyl group of the halogenated compound is converted into the desired type of ionic ester, for example, the sodium hemisuccinate.

The method used to introduce the halogen depends upon the halogen to be introduced and the position into which it is to be substituted. The compounds having the normal configuration at the 5-position are chlorinated at the 4-position by treatment with tertiary butyl hypochlorite in acetic acid. When a compound having the allo configuration at the 5-position is so treated with tertiary butyl hypochlorite in acetic acid, chlorine is introduced at the 2-position. Bromine is introduced at the 4-position of a compound having the normal configuration at the 5-position by treating the compound with elementary bromine in acetic acid. When a compound having the allo configuration at the 5-position is so treated with elementary bromine in acetic acid, the bromine is introduced at the 2-position.

Regardless of the configuration at the 5-position, halogen is introduced at the 17-position by treating the steroid with an N-halo-succinimide, using a solvent such as chloroform. N-bromosuccinimide is used to introduce bromine and N-chlorosuccinimide is used to introduce chlorine.

Bromine at the 21-position is introduced into compounds having three hydrogens at the 21-position carbon atom, regardless of the configuration at the 5-position, by treatment with a dialkyl ester of oxalic acid, for example diethyloxalate, and a sodium alkoxide, for example sodium methoxide, followed by treatment with elementary bromine. When a compound contains bromine at the 21-position, it must contain the ionic ester group at the 3-position.

Thus it is apparent that the methods illustrated in the following examples are general in their application and are not to be confined to the particular compound there being prepared.

It should be mentioned that the compounds described in copending application Serial No. 508,802, filed May 16, 1955, and now abandoned, by Gerald D. Lubach, that is, compounds which are derivatives of the 3-position keto compounds of the above formula and which have at the 3-position a ketal, thioketal, nitrogeneous heterocyclic group or the like, are also useful when halogen has been introduced in accord with the method of this present invention.

The following examples are given solely for the purpose of illustration and are not to be construed as limitations of this invention, many variations of which are possible without departing from the spirit or scope thereof.

*Example I*

Two tenths of a gram of 21-hydroxypregnane-3, 20-dione hemisuccinate was dissolved in 2 mls. of glacial acetic acid and warmed on a steam bath. Seven hundredths mls. of tertiary butyl hypochlorite was added and the mixture was heated for one hour on a steam bath, then allowed to stand overnight. After several hours a crystalline precipitate had formed. This was filtered off and recrystallized from a mixture of chloroform and ethyl acetate. The compound was treated with dilute aqueous sodium bicarbonate to form the sodium hemisuccinate which was recovered from the aqueous solution by freeze drying. This product, 21-hydroxypregnane-4-chloro-3, 20-dione sodium hemisuccinate, when injected intravenously into mice, produced hypnosis in 50% of the animals in a dosage of approximately 65 mg./kg. of body weight.

*Example II*

1 millimole of 21-hydroxypregnane-3, 20-dione hemisuccinate was placed in 8 cc. of glacial acetic acid. The steroid did not go into solution but remained as a fine suspension. A previously prepared solution of 1.1 millimoles of bromine dissolved in 2.5 cc. of glacial acetic acid was added dropwise. The first few drops were added and some decolorization took place. To accelerate the decolorization, a drop of 48% HBr was added and it immediately decolorized. The remainder of the bromine solution was slowly added dropwise. The total adding time was approximately 2 hours. The product was isolated by adding 15 cc. of water, chilling, scratching the sides of the container, filtering and drying. The product was next purified by recrystallization from ethyl acetate and identified as 21-hydroxypregnane-4-bromo-3, 20-dione hemisuccinate. The sodium salt was prepared by treatment with aqueous sodium bicarbonate and freeze drying.

When injected intravenously in mice, this compound produced hypnosis in 50% of the animals at a dosage of 50 mg./kg. of body weight.

*Example III*

The procedure of Example I was repeated except that in place of using the normal steroid compound, the allo steroid compound was used. In an analogous fashion, the product 21-hydroxyallopregnane-2-chloro-3, 20-dione sodium hemisuccinate was prepared.

*Example IV*

The procedure of Example II was repeated except that the allo compound was used as the starting steroid. In an analogous manner, the product 21-hydroxyallopregnane-2-bromo-3, 20-dione sodium hemisuccinate was prepared.

*Example V*

0.433 g. of 21-hydroxypregnane-3, 20-dione hemisuccinate was stirred in 5 mls. of hot chloroform and 0.32 g. of N-bromosuccinimide was added. Stirring and heating were maintained until the mixture boiled, at which time the heating was removed and a photo flood lamp substituted for 5 minutes. The mixture was cooled and the precipitate filtered off. The solid material was dissolved in a chloroform, washed once with 10% aqueous sodium bisulfite, and twice with water. The chloroform was removed under vacuum on a water bath, and the solid residue was recrystallized from a mixture of ether and hexane. By treatment with aqueous sodium bicarbonate and freeze drying, the product 21-hydroxypregnane-17-bromo-3, 20-dione sodium hemisuccinate was prepared.

*Example VI*

In a manner analogous to the procedure of Example V, the compound 21-hydroxypregnane-17-chloro-3, 20-dione-21-hemisuccinate was prepared. In this preparation, N-chlorosuccinimide was used in place of the N-bromosuccinimide used in Example V.

*Example VII*

Into a one liter, four-necked flask, fitted with a dropping funnel, thermometer, mechanical stirrer, and reflux condenser, and protected from moisture with a calcium chloride drying tube, was charged 500 mls. of dry normal propyl alcohol and 6.5 g. of sodium methoxide. The stirred mixture was then heated at 60° C. and 3.1 g. of pregnane-3α-ol-20-one was added to the clear solution. Heating was then continued until the steroid had all dissolved and the temperature was 70° C. At this temperature, 30 mls. of diethyl oxalate was added rapidly with continued heating. The stirrer was quickly turned up to a maximum speed. The solution darkened in color and became very cloudy. The rate of precipitation rapidly increased and vigorous stirring was required to maintain the mobility of the mixture. The temperature at this point was 75° C. The mobility rapidly increased and stirring could be slowed somewhat. The temperature was then raised to 90° C. and the mixture was allowed to cool to room temperature over a period of two hours and then filtered through medium porosity sintered glass. The product was washed with two 50 ml. portions of normal propyl alcohol, sucked as dry as possible, and then dried in vacuo at 60° C. to give a product which still contained some solvent.

Into a three-necked flask, fitted with a dropping funnel, thermometer, and mechanical stirrer, were charged 1.06 g. of propanol-wet sodio ethoxallylpregnanolone from the above reaction and 5.25 mls. of methyl alcohol. The temperature was maintained at about 20° C. After the addition of 0.05 g. of solid sodium methoxide, 0.13 g. of elementary bromine was added all at once at this temperature, which was maintained with stirring for two hours. While maintaining the temperature by use of a water bath, 6 mls. of water was then added over a period of about 30 minutes, thereby causing the formation of a precipitate. The mixture was stirred for an additional 15 minutes and then the precipitate was removed by filtration through medium porosity sintered glass. The precipitate was washed with water, dried and purified by recrystallization. The product was 3α-hydroxypregnane-21-bromo-20-one. The 3-position hydroxyl group was esterified by treatment with succinic anhydride and the hemisuccinate thus produced was treated with aqueous sodium bicarbonate to produce the compound pregnane-3α-ol-21-bromo-20-one-3-sodium hemisuccinate.

What is claimed is:

1. A compound having the formula

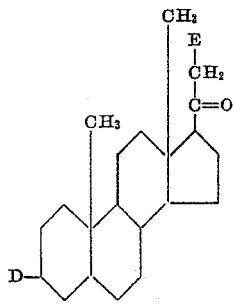

in which D is selected from the group consisting of ionic ester groups having the formula

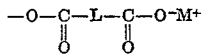

and ionic ester groups having the formula

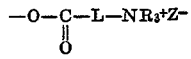

wherein L is chosen from the group consisting of $-(CH_2)_n-$, $-O-(CH_2)_n-$ and $-NH-(CH_2)_n-$, $n$ being a number from 1 to 6, $M^+$ is a cation selected from the class consisting of $Na^+$, $K^+$ and $NR_4^+$, each R represents a member of the group consisting of hydrogen and alkyl, hydroxyalkyl, hydrocarbon carboxyalkyl, aminoalkyl, aryl and aralkyl groups, each containing up to ten carbon atoms, and $Z^-$ is a pharmacologically acceptable anion, hydroxyl and hydrocarbon carboxylic acid esters thereof containing from 1 to 8 carbon atoms in the added moiety, oxime, hydrocarbon carboxylic acid esters thereof containing from 1 to 8 carbon atoms in the added moiety, and ionic esters thereof as defined above, and keto, and in which E is selected from the group consisting of ionic ester groups as defined above, hydroxyl and hydrocarbon carboxylic acid esters thereof containing from 1 to 8 carbon atoms in the added moiety, and hydrogen, with at least one of D and E being an ionic ester group as defined above, and having from 1 to 2 halogen substituents chosen from the class consisting of chlorine and bromine at the 2-position when the 5-position is allo, chlorine and bromine at the 4-position when the 5-position is normal, chlorine and bromine at the 17-position, and bromine at the 21-position.

2. A pharmaceutical composition which consists of a compound as claimed in claim 1 together with a pharmaceutically acceptable carrier.

3. An anesthetic agent consisting of a sterile, injectable aqueous solution of a compound as claimed in claim 1.

References Cited in the file of this patent

UNITED STATES PATENTS

| | | |
|---|---|---|
| 2,359,772 | Marker | Oct. 10, 1944 |
| 2,369,065 | Marker | Feb. 6, 1945 |
| 2,441,560 | Butenandt | May 18, 1948 |
| 2,584,159 | Rosenkranz | Feb. 5, 1952 |
| 2,708,651 | Laubach | May 17, 1955 |